United States Patent [19]

McCoy

[11] 3,770,605
[45] Nov. 6, 1973

[54] APPARATUS AND METHOD FOR REMOVING SOLIDS FROM LIQUIDS

[75] Inventor: Lowell R. McCoy, Woodland Hills, Calif.

[73] Assignee: Rockwell International Corporation, El Segundo, Calif.

[22] Filed: Mar. 8, 1971

[21] Appl. No.: 121,902

[52] U.S. Cl. ............................ 204/188, 204/305
[51] Int. Cl. .................... B01d 13/02, B03c 5/00
[58] Field of Search ........................... 204/186–191, 305, 302, 304, 306, 308

[56] References Cited
UNITED STATES PATENTS

| | | | |
|---|---|---|---|
| 1,162,213 | 11/1915 | Bloom | 204/186 |
| 1,533,711 | 4/1925 | Stevens | 204/188 |
| 2,364,118 | 12/1944 | Wolfe | 204/188 |
| 3,190,827 | 6/1965 | Kok et al. | 204/186 |
| 3,324,026 | 6/1967 | Waterman et al. | 204/305 |

FOREIGN PATENTS OR APPLICATIONS 741,491 12/1955 Great Britain ..................... 204/305

*Primary Examiner*—T. Tufariello
*Attorney*—L. Lee Humphries, Thomas S. MacDonald, Robert M. Davidson and Henry R. Kolin

[57] ABSTRACT

An apparatus and method for removing solid contaminants from liquids are disclosed. Removal is effected by passing the contaminated liquid between two electrodes where it is subjected to a low frequency A.C. or interrupted D.C. field. Preferred embodiments include the use of an insulated electrode and a surface for collecting solids. Multistage devices are also disclosed.

8 Claims, 9 Drawing Figures

INVENTOR.
LOWELL R. McCOY

BY Robert M. Davidson

ATTORNEY

PATENTED NOV 6 1973 3,770,605

INVENTOR.
LOWELL R. McCOY

BY Robert M. Davidson

ATTORNEY

APPARATUS AND METHOD FOR REMOVING SOLIDS FROM LIQUIDS

BACKGROUND OF THE INVENTION

FIELD OF INVENTION

This invention relates to the field of solids separation from liquid-solid mixtures. It is primarily concerned with the removal of entrained or dispersed solids from a liquid containing the same. The invention finds particular use in the removal of finely dispersed particulate matter from liquids in which the presence of particulate matter is considered undesirable. It is commonly desired to remove particulates such as dirt or dust from hydrocarbon fuels which are combusted in engines. Dirt and dust are often the inevitable result of shipment and storage. This problem is particularly actue with regard to contamination of fuel used in airborne vehicles. Particulate contamination of aircraft or missile fuel can cause poor performance or even engine "flameouts" resulting in loss of personnel and extensive property damage. Hydrocarbon burning rocket engines are similarly prone to malfunctions caused by particulate matter in the fuel.

Land vehicles and stationary engines are also adversely affected by hydrocarbon fuels containing solid particulates. Particularly severe problems are encountered in off-highway construction vehicles where relatively large amounts of dust and dirt find their way into fuel supplies and vehicle fuel tanks. Contaminants in burner fuels lead to plugging and erosion of burner orifices causing a reduction in efficiency and requiring continuous maintenance.

Lubricating oils, cleaning fluids and industrial solvents become contaminated with solid particulates through use and must be decontaminated in order to retain their effectiveness.

The present invention provides a means for removing solid particulate contaminants from liquids including those discussed above.

DESCRIPTION OF THE PRIOR ART

Various means have been employed to remove dispersed particulates from liquids. By far the most common technique used in the prior art is mechanical filtration. Filter-separator devices as known in the art have several limiting and disadvantageous characteristics. Very small particles are difficult to remove except by the use of tightly compressed or very fine pored filter media. Large pressure drops are associated with such filters and increase in magnitude with service as particulate matter accumulates. Surface active materials in the liquid may assist in dispersion of the solid matter and render its removal more difficult.

Due to the deficiencies inherent in mechanical filtration, various alternative systems for separating solids from liquids have been proposed. Many proposed separative systems utilize the forces established by electrical fields to separate solid particulates from liquids. Some of these systems operate as electrostatic separators. U. S. Pat. Nos. 3,129,157; 3,252,885; and 3,398,082 exemplify the electrostatic removal method. In electrostatic separation, the fluid undergoing treatment is generally subjected to ionization to impress an electric charge on the particles contained therein. The particles are then collected or coated on a collector electrode. One limitation of electrostatic devices is their inability to operate effectively if the fluid undergoing treatment contains electrically conductive material such as metallic particles and/or small quantities of suspended water. Conductive contaminants will cause arcing to occur between the electrodes requiring current interrupters to avoid damage to the power supply. At such times, the electric field is removed and either untreated fluid will pass through the device or the flow of fluid must be stopped until the material causing the malfunction is removed.

Other devices known as electrical filters operate on a principle similar to the electrostatic devices. Known electric filters operate on constant voltage direct current and usually incorporate a dielectric open pored material between the electrodes. U. S. Pat. No. 2,573,967 and 3,324,026 exemplify this type of device. Electric filters as described share with electrostatic devices the problems of being limited to water-free dielectric fluids and the problem of electrical discharge between electrodes.

In view of the limitations inherent in prior art devices, there remains in the art a need for an efficient system for separating solids form fluids such as hydrocarbons which is operative when small amounts of water are present and which does not require a large amount of energy for operation.

SUMMARY

The present invention is directed to an apparatus and method for enhancing the effects of electrical fields in achieving the removal of finely divided solids from liquids such as petroleum fuels, organic cleaning fluids, solvents, gasoline, oils, liquid fats and the like.

The apparatus includes an electrical cell structure consisting of at least two electrodes one of which is insulated, means to supply interrupted direct current or low frequency alternating current to said electrodes and means to pass liquid contaminated with solid particles between said electrodes. A surface for collecting solids may also be interposed between the electrodes.

The method described herein relates to the removal of solids from liquids containing the same. Contaminated liquids are treated by passage through an interrupted direct current or low frequency alternating current field at relatively high voltages.

The present invention also concerns the staging of electrodes within a cell or the staging of cells or both for the purpose of improving performance and capacity.

As described herein, the present invention has been found to be particularly effective in the removal of finely divided and dispersed particles of dirt, rust and the like from hydrocarbon liquids. The presence of contaminants such as these pose a particularly critical problem in fuels. Consequently, the invention is most particularly directed to the purification of hydrocarbon fuels.

In accordance with the needs of the art and in consideration of the nature of the present invention the primary objects of this invention are:

to provide an improved means for the separation of finely dispersed particles from liquids containing the same;

to provide an improved means for the separation of finely dispersed particles from hydrocarbon liquids;

to provide an improved electrical cell for the removal of finely dispersed particles from liquids;

to provide an improved electrical cell for the removal of finely dispersed particles from hydrocarbon liquids, and to provide an improved method of removing finely dispersed particles from liquids.

These and other objects and advantages of the invention will become more apparent upon consideration of the following detailed description of the most preferred embodiments wherein reference is made to the figures of the attached drawings.

DESCRIPTION OF THE PREFERRED EMBODIMENTS

In general terms, the present invention relates to an apparatus and method for removal of particulate matter from liquids wherein the liquid to be treated is passed between electrodes which are supplied with periodically interrupted voltage. For purposes of description herein, periodically interrupted voltage (or current) will refer to interrupted direct (unidirectional) current and to low frequency alternating current.

The period of time at which the full voltage is applied and the period of time at which the externally applied voltage is not present are preferably, not necessarily, equal. If one electrode is at ground potential, as will usually be the case, the potential of the other electrode, insulated electrically from the fluid being treated, will describe a square wave. Alternatively, the potential of the insulated electrode may be caused to vary in alternate polarity with respect to the opposite electrode. Such a voltage regime will be described as an alternating square wave or simply as an alternating voltage. Sinusoidal waves of alternating polarity and of comparable frequency and voltage magnitude may also be used.

In more specific terms, the preferred forms of the invention relate to an apparatus and method for the removal of solids from liquids such as hydrocarbon liquids.

Figure 1:
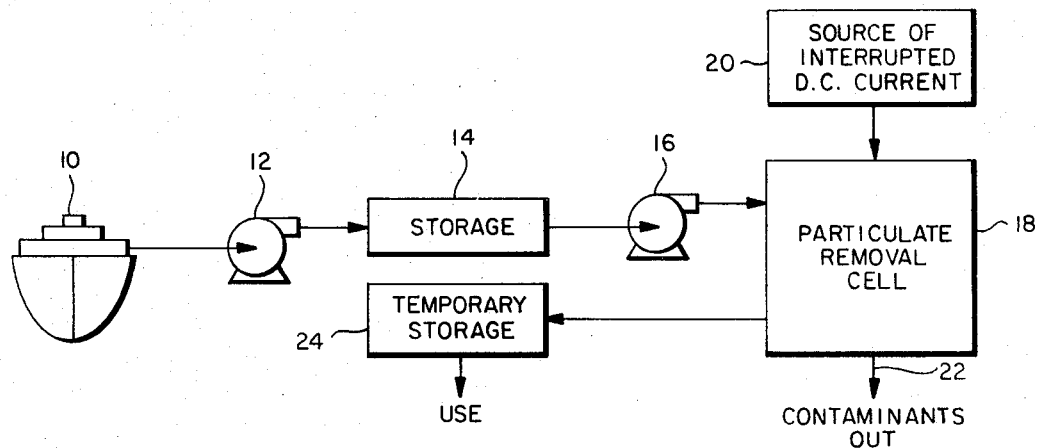
FIG. 1 is a schematic diagram showing the principal parts of the invention as used to decontaminate liquids such as transported hydrocarbons.

In this connection, reference is made to FIG. 1 wherein 10 represents a vessel or other transporter laden with a hydrocarbon fuel such as gasoline, diesel fuel or jet fuel. As is normally the case, FIG. 1 shows the fuel being supplied via pump 12 to a storage tank 14 for temporary storage prior to use. A common result of transportation and storage is the contamination of fuels with particulate material such as dirt, dust and rust. It is important that particulate contamination be eliminated or at least reduced to acceptable levels prior to using the fuel. Tolerance limits with regard to particulate contamination vary depending upon the fuel and its use. In certain applications, levels as low as 0.5 ppm are required, and in all applications the efficiency of fuel combustion and lifetime of engines can be improved by reducing particulate contamination.

FIG. 1 illustrates the treatment of stored fuel. Pump 16 withdraws fuel from storage and supplies it to particulate removal cell 18, details of which are described hereinafter. In cell 18, the liquid is passed between two electrodes. These electrodes are in electrical communication with source 20 which supplies periodically interrupted voltage as described above. The particulate contaminants are removed by way of a conduit 22, the purified fuel being fed to a temporary storage vessel 24 for later use.

The duration, i.e., the period, of a "cycle" of the periodically interrupted voltage will generally be two to five seconds. It may be above or below that range depending upon the nature of the liquid undergoing treatment, the nature of the solid contaminants, cell geometry and flow rates. The voltage applied can be varied from about 1000 to 20,000 volts. The lower limit will be determined by the voltage offering the least acceptable degree of particulate removal; the upper limit will be dictated by the cost of operation and the practical dielectric strength of the insulation present on the uninsulated electrode. As a result of the electrical field caused by the application of periodically interrupted voltage of constant or alternating polarity, particulate matter suspended in the fluid is caused to be firmly deposited on the walls of the device, generally in those areas most immediately affected by the electrical fields. As the capacity of the device for deposited solids is limited by the area provided by the electrodes, capacity can be substantially increased by the inclusion of a relatively coarse pored packing material between the electrodes which offers a substantial surface for deposited solids to accumulate. Packing media consisting of fiberglass commonly used in furnace air filters and similar materials have been found effective even though they are almost completely ineffective when operated as simple mechanical filters in the absence of electrical fields. The obstruction to the flow of fluid caused by such a material is a small fraction of that caused by the use of a mechanical filter of nearly equal effectiveness in removal of solid material.

Unlike the electrostatic or electrofiltration devices described by others, the use of a constant, uninterrupted (D.C.) voltage is without practical benefit in this invention. This is believed due to the use of electrical insulation on at least one of the electrodes in each electrode pair. The presence of the insulation prevents the transfer of electrical charges to or from particles to electrodes and thus precludes electrophoretic deposition cited by others as a clarifying mechanism. Although the use of alternating voltages of frequencies greater than about 60 cycles/sec. or greater have been found effective in removing suspended water from organic fluids, these frequencies have been found to be almost wholly ineffective for removal of suspended solids from fluids using the invention described here.

As a result of the electrical field caused by the application of interrupted D.C. voltage to the electrodes, particulate matter within the liquid is deposited as a firmly compacted and adherent layer on the electrode surfaces or on other essentially non-conductive surfaces interposed between the electrodes.

APPARATUS

Figure 2:
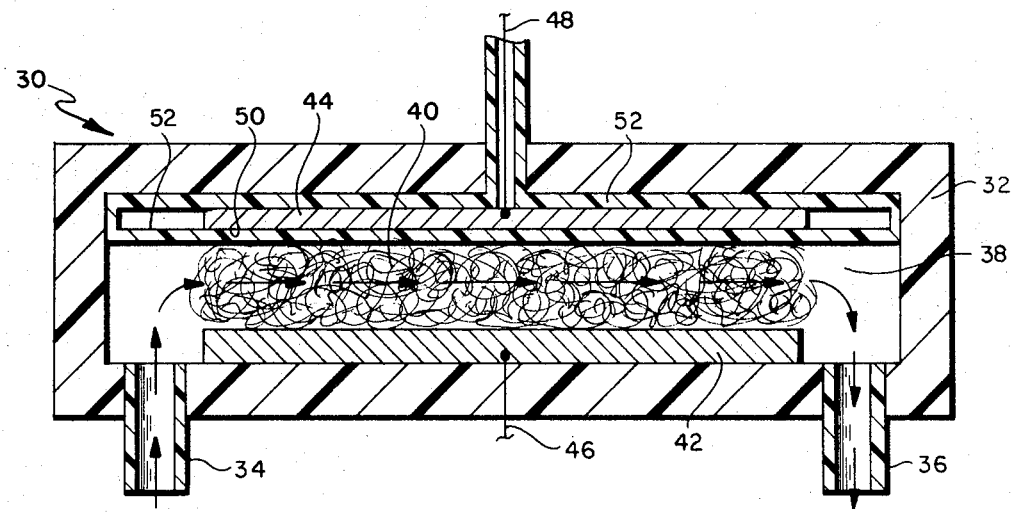
FIG. 2 is a schematic diagram and sectional plan view of the apparatus showing the major components thereof and the flow of liquid to be treated.

An example of an electrical cell which demonstrates the present invention is shown in FIG. 2. That figure shows a plan view of a cell in cross section. There, cell 30 is seen as comprising a closed electrically insulating container 32 provided with an inlet 34 for the liquid undergoing treatment and an outlet 36 for treated liquid. The inlet and outlet are in fluid communication with an internal channel 38. As shown, channel 38 contains a fibrous mass 40 consisting of a high surface area material such as fiberglass fibers. Adjacent the sides of channel 38 are two plate type electrodees 42 and 44. Electrode 42 is connected through ground by lead 46 to an electrical source. This source must provide interrupted D.C. or alternating high voltages to the electrodes. Disposed in opposing relationship to electrode 42 is the high voltage electrode 44 connected through lead 48 to the electrical source (not shown). The working surface 50 of electrode 44 is coated or covered with a layer of electrically insulating material 52. As shown in FIG. 2, electrode 44 should be substantially enveloped with insulating material 52.

In operation, liquid to be treated is pumped through channel 38 between electrodes 42 and 44 and through fibrous mass 40. During passage through channel 38 the liquid is subjected to an electrical field caused by the application of interrupted D.C. voltage to electrodes 42 and 44. The effect of this field is to cause finely divided particles entrained within the liquid to agglomerate and collect on the surface of fibrous mass 40. Liquid depleted in particulate matter is withdrawn from outlet 36.

Figure 7:
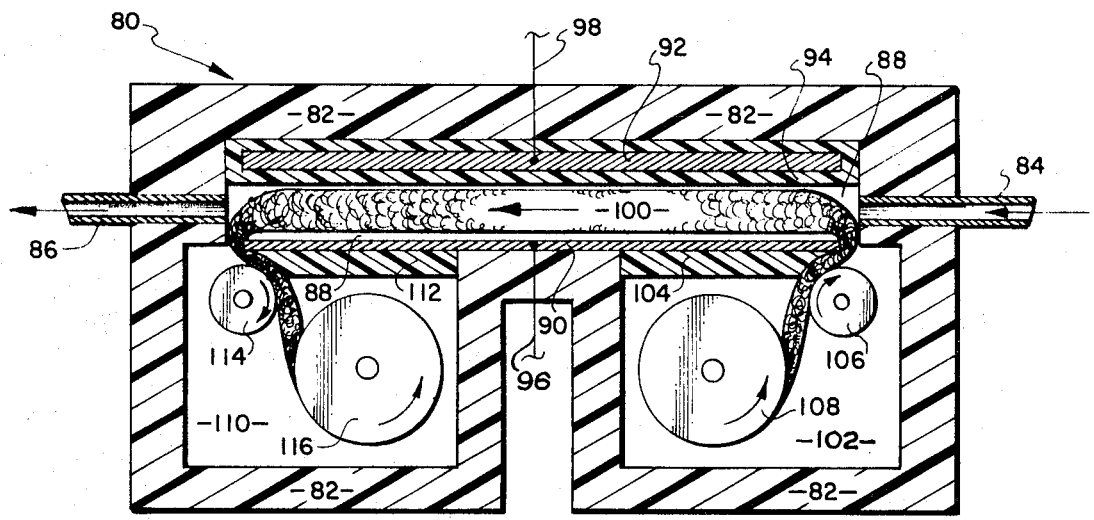
FIG. 7 is a schematic diagram illustrating a cell having a movable belt of fibrous mass.

Because the fibrous mass 40 shown in FIG. 2 will become so filled with dirt as to require its replacement after some period of use it may be desirable in certain applications to use a movable belt of fibrous material as illustrated in FIG. 7. There, cell 80 is seen as comprising an outer insulated casing 82 provided with an inlet 84 and outlet 86. A channel 88 is formed between two electrodes 90 and 92, the latter of which is insulated from channel 88 by a covering 94. Electrical leads 96 and 98 supply voltage to electrodes 90 and 92, respectively. A movable fibrous mass or belt 100 is positioned along flow channel 88. One end of this belt originates in a cavity 102 formed within outer insulated casing 82 and an insulating member 104 disposed against the underside of electrode 90. Belt 100 rides over a guide roller 106 and around spool 108 to which it is attached. In FIG. 7, spool 108 is the feed spool. The other end of belt 100 enters chamber 110 formed from a similar cavity in casing 82 and bounded by insulating member 112 attached to electrode 90 where it rides over guide roller 114 and around spool 116 to which it is attached. In this configuration, 116 is shown as a take-up spool.

In operation, a periodically interrupted voltage is supplied to electrodes 90 and 92 and spool 116 would be slowly or intermittently rotated causing belt 100 to move along channel 88 thereby continually presenting new surface area between the electrodes. Many other modifications and designs of moving belt cells are possible, the design shown in FIG. 7 merely being illustrative of one such design.

Figure 3:
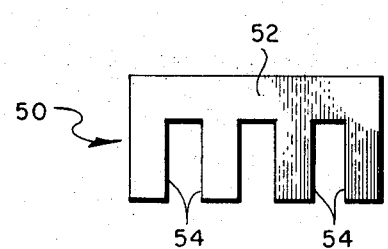
FIG. 3 is a schematic diagram illustrating one form of multiportioned electrode which may be used in the invention.
Figure 4:
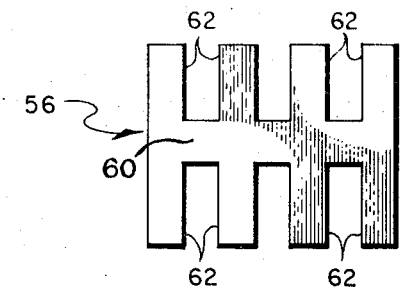
FIG. 4 is a schematic diagram illustrating a second form of multiportioned electrode which may be used in the invention.

FIGS. 3 and 4 schematically illustrate some preferred electrode shapes. FIG. 3 illustrates a multi-portioned electrode 50 having a continuous upper portion 52 and multiple finger portions 54. Similarly FIG. 4 illustrates a multiportion electrode 56 having a continuous central portion 60 and finger portions 62. It is believed that electrode structures having multiple portions such as those shown in FIGS. 3 and 4 will give enhanced performance over continuous plate-type electrodes such as those of FIG. 2.

Figure 5:
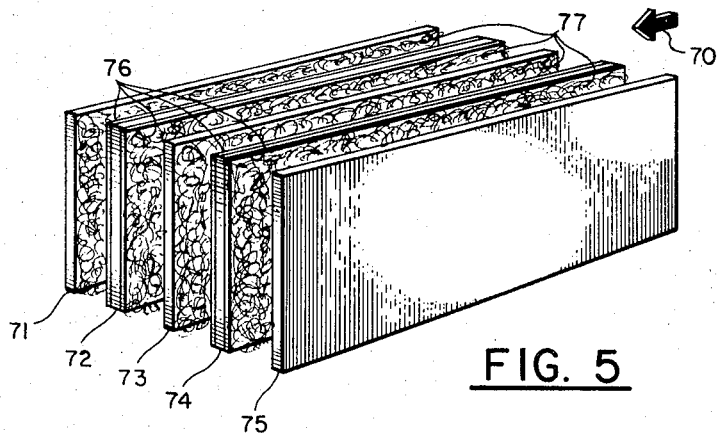
FIG 5 is a schematic diagram illustrating the use of multiple parallel electrodes to provide a plurality of flow channels.

The use of multiple stage treatment is foreseen as a way of carrying out the present invention. Multiple stages in series may be formed by merely serially aligning cells such that the output of the first cell is supplied as the input to the next cell and so forth. Parallel multiple staging is accomplished either by dividing the total stream of liquid to be treated into plural parallel flow streams which are provided to separate cells or by use of multiplate arrangement as illustrated in FIG. 5. In that figure, 70 represents a flowing stream of liquid which contains finely divided and dispersed solid, particulate contaminants. Flow stream 70 is directed between parallel electrodes 71, 72, 73, 74 and 75. The electrodes are connected to a source of interrupted D.C. voltage with electrodes 71, 73 and 75 being connected to the source ground. Charged electrodes 72 and 74 are preferably covered with a coating of insulating material 76. Disposed between the electrodes is a fibrous mass 77 which serves as a collector of the solids as previously described. The end electrodes 71 and 75 may form the walls of the device and insulating containers 32 and 82 shown in FIGS. 2 and 7, respectively, are then not required.

The cell design as shown in FIG. 5 allows each charged electrode to provide a voltage gradient to two flow channels. Thus fewer electrodes are required than if a plurality of two electrode cells are combined in a parallel.

While the electrode plates have been heretofore described as flat rectangular parallel plates, it is not necessary that the electrodes be rectangular in shape or parallel in placement.

Figure 8:
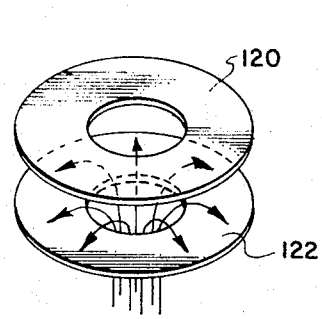
FIG. 8 is a schematic diagram illustrating a configuration wherein the electrodes are circular plates.
Figure 9:
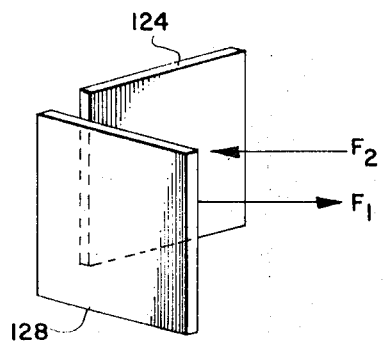
FIG. 9 is a schematic diagram illustrating a configuration wherein the electrode plates are divergent with respect to each other.

In this connection, reference is made to FIGS. 8 and 9. FIG. 8 illustrates an electrode arrangement having parallel plates and radial flow. There, 120 and 122 represent two electrodes, one of which has an insulated surface as previously described. Fluid to be treated flows between the electrodes as indicated by the arrows in the figure after entering via the center opening of one of the electrodes. An electrode design as shown in FIG. 8 furnishes a constant voltage gradient and a decreasing velocity of fluid flow, the latter due to an increase in flow area with increasing diameter. In some instances a decreasing flow velocity aids in the removal of contaminants. In addition, it is foreseen that where the contaminant has a greater density than the fluid being purified, circular cells of this type might be rotated thereby imparting a centrifuge-type action on coalesced particles thereby aiding in contaminant removal. If desired, fluid flow may be in the reverse so that an increasing velocity regime is presented.

FIG. 9 illustrates another alternative cell design. There, 124 and 128 represent the working electrodes, selecting ones of which may have a particular covering or insulation thereon as discussed previously. Fluid to be treated may flow in the direction of arrow $F_1$ or arrow $F_2$. In the first instance the conditions are of decreasing electric field accompanied by a decreasing fluid flow rate. In the second instance the conditions are that of increasing electric field and increasing fluid flow rate. It is also clear that various other channel geometries may be utilized.

PROCESS

The present invention presents a novel and efficient process for separating solids from liquids. It is particularly effective in the separation of solid contaminants from hydrocarbon liquids such as fuels. The liquid to be treated is caused to flow between a first high voltage insulated electrode and a second grounded non-insulated electrode.

It has been observed that agglomeration and removal of the solids proceeds only when the electrode source consists of low frequency A.C. or interrupted D.C. voltages. In addition, it is desirable to provide a surface for the collection and removal of solid particles which are rendered easily removable by the imposition of the electrical field. Normally, this surface will consist of a mass of fibrous or filter-like material on which the solid particles may accumulate.

The frequency of the A.C. or interrupted D.C. voltage used will depend to some extent upon the nature of the liquid undergoing treatment. For liquid hydrocarbons such as kerosine, gasoline, diesel fuel and JP-5 jet fuel good results are obtained with a cycle time of from about 2 seconds to about 10 seconds. The preferred cycle time is from about five to about seven seconds. Solids are removed over a wide range of voltages depending upon the nature of the fluid, the amount and type of solids, the flow rate and the electrode spacing employed. Generally a voltage gradient of from about 20 kv per inch to about 100 kv per inch is used with the most preferred range for removing solids from liquid hydrocarbon fuels being from about 40 to about 80 kv per inch. Electrode spacing by itself is not a critical variable and may vary from about ⅛ inch to about ½ inch depending upon the voltage available. Of course larger spacings with attendant increase in voltages allow greater flow rates between a given pair of electrodes. The flow rate of fluid through the cell is also not a critical variable, but will normally have a certain maximum value due to cell design. In general, one will easily be able to determine the flow rate which yields an optimum or most effective residence time by experiment. The process has not been found to be either temperature or pressure sensitive.

The process of the present invention is illustrated by the following examples.

TEST APPARATUS AND PROCEDURE

The electrical cell used in the following examples was similar to that shown in FIG. 2. A spacer frame ⅛ inch thick was used to give a fuel-channel width of 3/16 inch. A cell packing consisting of a coarse fiberglass filter was usually placed between the electrodes. The residual level of solid contaminant in the treated fuel was measured using a Hellige turbidimeter with a dark filter and a 50-mm viewing-depth tube.

A working curve was prepared by injecting a suspension of solid particulate matter, consisting of red iron oxide or a silicaceous powder (A. C. dust) into the flowing liquid fuel at known ratio to yield fuel-solid mixtures of known composition. Samples of the contaminated liquid were withdrawn and turbidity readings were made in each case.

EXAMPLE I

Using the above described apparatus and procedure, a test was run to determine the effect of 60-cycle A.C. current on solids removal.

Particulate iron oxide was dispersed in JP-5 jet fuel at a concentration of 40 mg/liter of fuel. This contaminated fuel was treated with 60 cycle A.C. current at 13 kv (peak to peak) in the test cell. Under these conditions no solids removal was observed.

EXAMPLE II

A test similar to Example I was run under conditions of continuously applied D.C. at voltages up to 9.5 kv. Only transient clearing of the fuel was observed under these conditions as the voltage was first applied. There was no permanent effect on solids removal.

EXAMPLE III

A similar test was run with periodic application and removal of a 9-kv D.C. field at periods of 0.5 to 3 sec/cycle. Under these conditions a sustained clarification of the fuel was achieved.

EXAMPLE IV

This test was run under conditions similar to the previous tests except the fiber glass packing was removed from between the electrodes. The cell was operated at 9 kv D.C. and 2.5 sec/cycle. Fuel containing iron oxide was sent through the cell at 1.5 gph. The fuel leaving the cell was free of iron oxide for about one hour. Thereafter the effluent began to deteriorate in quality.

EXAMPLE V

The cell from Example IV was cleaned and reassembled with a coarse fiberglass packing between the electrodes. At 9 kv and 2.5 sec/cycle fuel containing iron oxide was pumped through the cell at 1.5 gph for over four hours without any noticeable iron oxide in the cell effluent.

EXAMPLE VI

Two tests comparable to that of Example V were run. The first at +9 kv at 2 sec/cycle and the second at ±4.5 kv at 2 sec/cycle. No difference in performance was noted between the interrupted fields where one was of constant polarity and the other of alternating polarity where the two fields had a comparable total voltage drop.

EXAMPLE VII

A series of tests were made to define the cycle time required to provide a low-level residual contamination in JP-5 fuel containing 40 mg/liter iron oxide particles. The cell used was similar to that of Examples V-IV and contained an electrode as shown in FIG. 3. The cell included a packing between the electrodes of resin-bonded fiberglass material measuring three inches by 7

Figure 6:
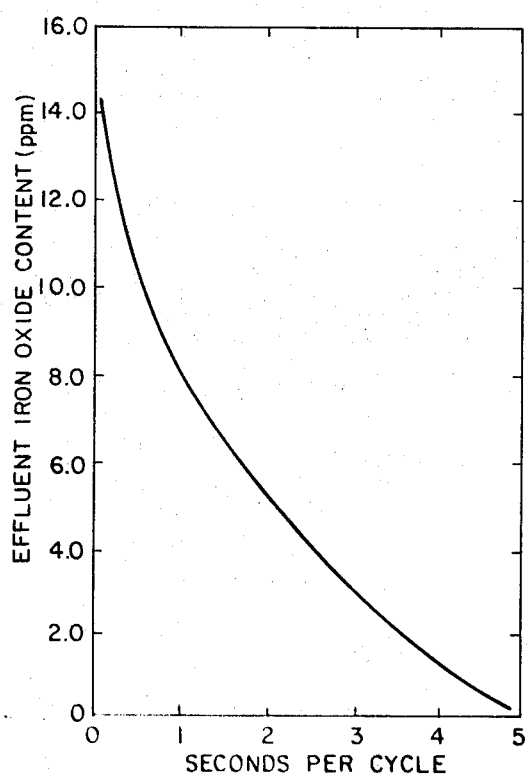
FIG. 6 is a graph illustrating the relationship between the period of the voltage supplied to the electrodes and the amount of particulate removal effected.

¾ inches by ⅝ inch thick (uncompressed) and 3.5 gms in weight. A slurry (0.25 gm/100 ml) of iron oxide particles in JP-5 fuel was injected into a 5/gph flow of JP-5 jet fuel at a rate sufficient to yield the stated contaminant level of 40 mg/liter. The results of operations at frequencies of from 0.2–1 cycle/sec. (periods of 1–5 seconds/cycle) and flowrates of about 6 gph are shown in FIG. 6.

While the invention has been described in terms of preferred embodiments and specific illustrative examples, it will be obvious to those of ordinary skill in the art that various modifications and adaptations of the invention are possible without departure from the spirit and scope of the invention as claimed hereinbelow. For example, whereas the preferred embodiments of the invention relate to the separation of water from hydrocarbon fuels, it is clear that other high dielectric constant contaminants can be separated from other low dielectric liquids. It is also apparent that the device and method of the present invention may be employed in cooperation with other conventional separatory devices or methods.

I claim:

1. An apparatus for removing solid particulate matter from a substantially nonconductive liquid containing the same, comprising:
   a. at least one pair of electrodes having spaced, facing surfaces defining therebetween a channel for the flow of said liquid,
   b. means to provide liquid flow to said channel,
   c. means to provide liquid flow away from said channel,
   d. a layer of a solid insulating material positioned on one electrode for electrically isolating it from said liquid, and
   e. means for applying an alternating or periodically interrupted unidirectional electric field of about 1,000 to about 20,000 volts between said electrodes and across said channel, said field having a frequency between about 0.1 and about one cycle per second.

2. The apparatus of claim 1 further including a mass of fibrous material positioned in said channel.

3. The apparatus of claim 1 wherein there is a plurality of pairs of said electrodes arranged to receive parallel liquid flow.

4. The apparatus of claim 1 wherein said members are positioned so as to form an acute angle with respect to each other along the line of liquid flow.

5. A method for enhancing the removal of finely divided particulate solids from a substantially nonconductive liquid containing the same, comprising passing a stream of said liquid through a channel defined by a pair of electrodes, one of which is electrically isolated from said liquid, and charging said electrodes with between about 1,000 and about 20,000 volts at a frequency of from about 0.1 to about one cycle/second.

6. The method of claim 5 wherein said liquid is a hydrocarbon.

7. The method of claim 6 wherein said hydrocarbon additionally contains electrically conductive contaminants.

8. The method of claim 5 wherein a mass of fibrous material is positioned in said channel.

* * * * *